United States Patent [19]

Glaser-Inbari

[11] Patent Number: 4,602,843

[45] Date of Patent: Jul. 29, 1986

[54] HOLOGRAPHIC DIFFUSION SCREEN AND METHODS FOR THE PRODUCTION THEREOF

[75] Inventor: Isaia Glaser-Inbari, Kiryiat Ono, Israel

[73] Assignee: Yeda Research and Development Company, Ltd., Rehovot, Israel

[21] Appl. No.: 446,651

[22] Filed: Dec. 3, 1982

Related U.S. Application Data

[63] Continuation-in-part of Ser. No. 51,754, Jun. 29, 1979, abandoned, which is a continuation of Ser. No. 815,425, Jul. 13, 1977, abandoned.

[30] Foreign Application Priority Data

Jul. 26, 1976 [IL] Israel ......................... 50125

[51] Int. Cl.$^4$ ........................... G02B 5/32; G03B 3/00
[52] U.S. Cl. ..................... 350/3.7; 354/201; 350/320
[58] Field of Search .............. 350/320, 3.7, 3.71, 350/3.72, 3.81, 162.11–162.14; 354/200, 201; 355/71, 44, 45

[56] References Cited

U.S. PATENT DOCUMENTS

| | | | |
|---|---|---|---|
| 3,619,021 | 11/1971 | Biederman | 350/3.70 |
| 3,619,022 | 11/1971 | Hirsch et al. | 350/3.81 |
| 3,708,217 | 1/1973 | McMahon | 350/3.70 |
| 3,909,111 | 9/1975 | Meyerhofer | 350/3.81 |
| 3,953,105 | 4/1976 | Ih | 350/3.71 |
| 4,027,327 | 5/1977 | Harada | 350/3.72 |

OTHER PUBLICATIONS

Glaser, I., thesis: "Processing and Display of Three Dimensional Data by Optical and Holographic Methods", title, contents pages and chapter 3: pp. 3-1-3-23.

*Primary Examiner*—John K. Corbin
*Assistant Examiner*—B. S. Shapiro
*Attorney, Agent, or Firm*—Browdy and Neimark

[57] ABSTRACT

An optically-generated or computer-generated holographic diffusing screen usable in bringing an image to focus thereon is a hologram which upon reconstruction displays a substantially transparent annulus on a substantially opaque background. The annulus preferably has an outer diameter substantially equal to the exit pupil of the image-forming lens, which image is to be focused. The radial width of the transparent annular portion is very small relative to the outer diameter of the annulus. The holographic diffusion screen may be formed by making a holographic image of the substantially annular pattern or by exposing a holographic plate with two collimated mutually coherent beams of light, one beam being perpendicular to the plate while the other is at an angle with respect to the first beam, rotating the holographic recording plate a predetermined amount, and repeating the exposing and rotating steps until a predetermined number of exposures has been completed.

22 Claims, 13 Drawing Figures

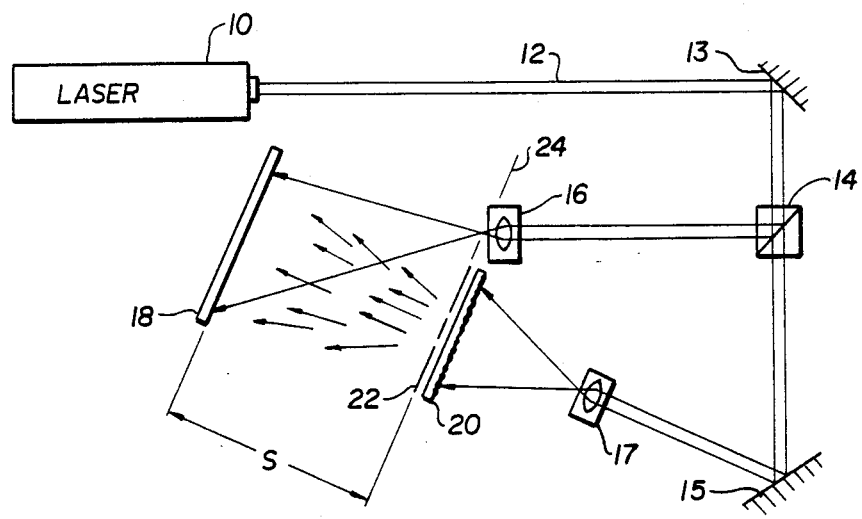
FIG.4
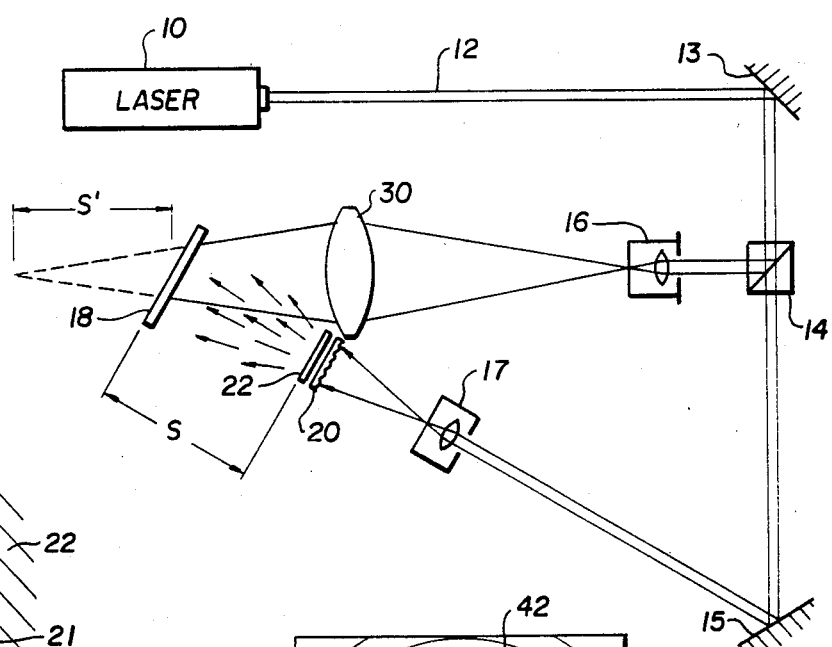
FIG.5
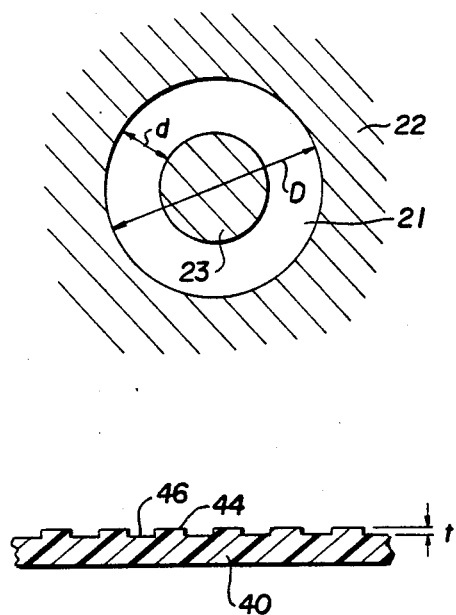
FIG.7
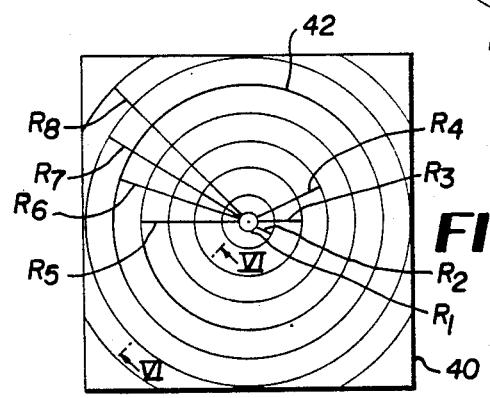
FIG.8B
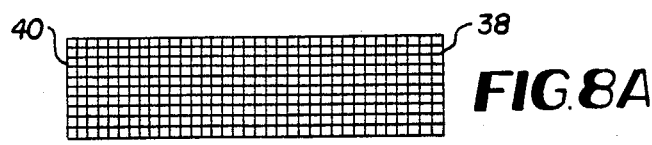
FIG.9
FIG.8A

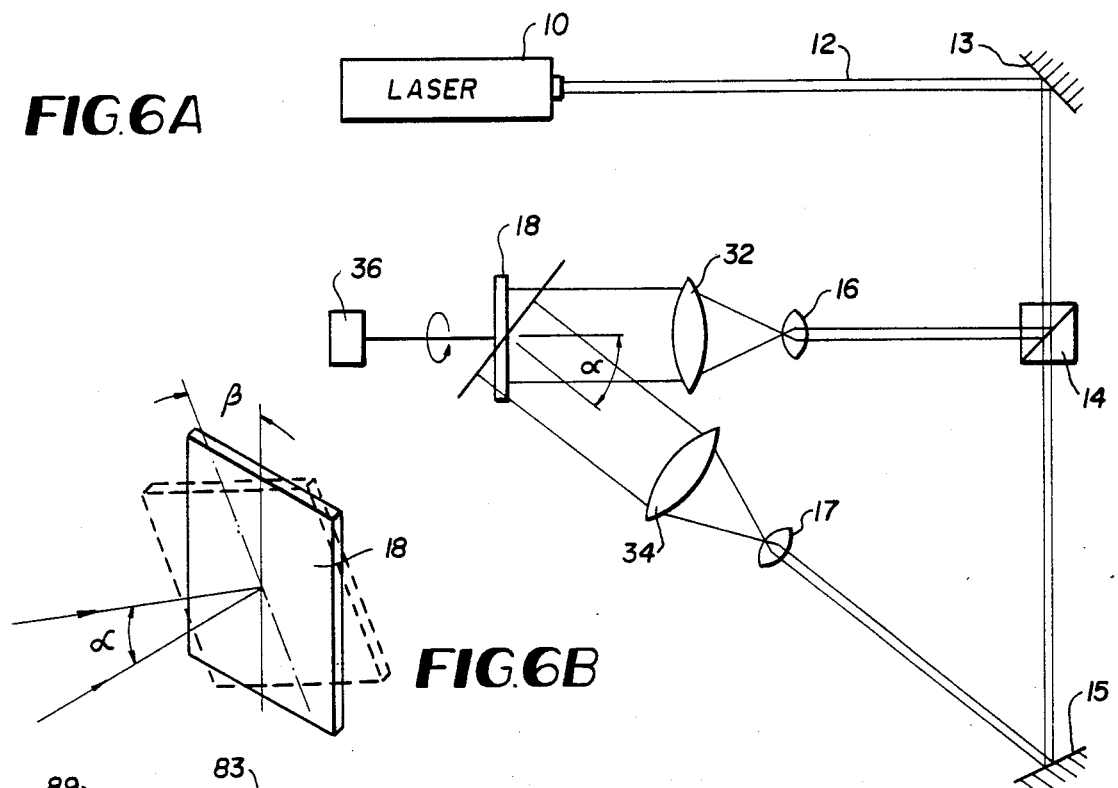
FIG.6A
FIG.6B
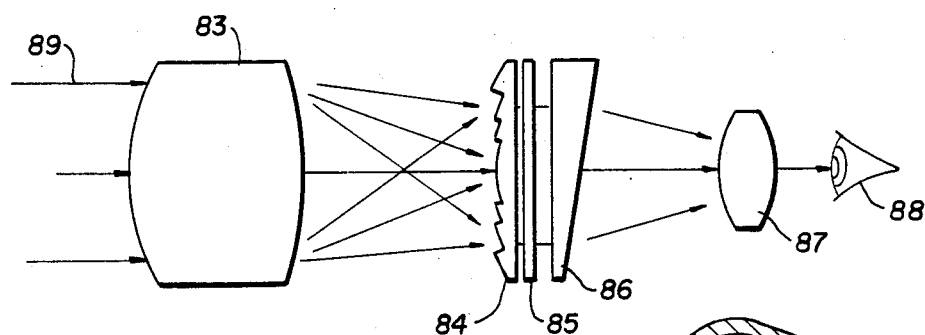
FIG.10
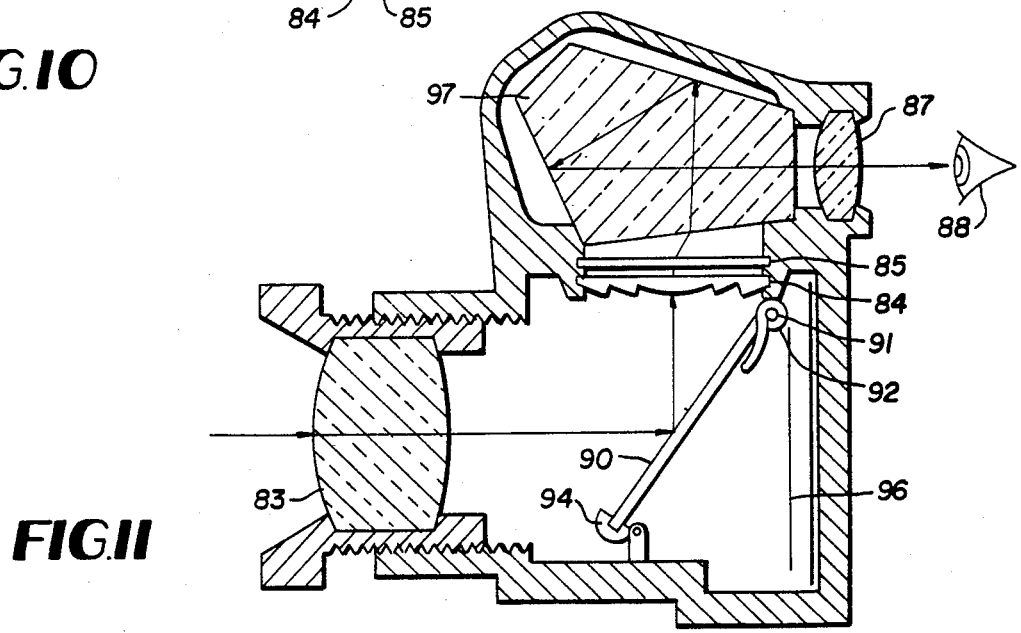
FIG.11

HOLOGRAPHIC DIFFUSION SCREEN AND METHODS FOR THE PRODUCTION THEREOF

CROSS-REFERENCE TO RELATED APPLICATIONS

The present application is a continuation-in-part of U.S. application Ser. No. 51,754 filed June 29, 1979, now abandoned which in turn was a continuation off U.S. application Ser. No. 815,425 filed July 13, 1977, now abandoned, the entire contents of both of which being hereby incorporated herein by reference.

FIELD OF THE INVENTION

The present invention relates to apparatus for diffusing light and more particularly to focusing screens useful in optical apparatus such as photographic cameras.

BACKGROUND OF THE INVENTION

In the use of many optical instruments it is necessary to determine the precise axial location, i.e. the focus, of an image. In the case of photographic cameras, for example, it is necessary to align the photographic film along the image plane. The image plane is in turn located behind the camera lens by a distance which varies as a function of the distance between the object being imaged and the lens.

The human eye, unaided, is generally unable to locate an aerial image with precision due to the automatic accommodation of the human eye. In order to overcome this difficulty, a focusing screen is usually inserted at the expected image plane for the purpose of diffusing images which are not in focus by a sufficient amount so as to overcome the eyes' accommodation.

Focusing screens are generally formed of ground glass which is prepared by surface treatment of a glass sheet usually by an abrasive substance. Ground glass screens involve a number of drawbacks, however. The principal drawback is that the amount of light which passes through the focusing screen decreases as the extent of the blur provided by the screen increases. Ground glass thus cannot provide outstanding focus discrimination without undesirable sacrifice in brightness.

Another disadvantage of ground glass focusing screens is that the surface structure of the ground glass, being relatively large, tends to be visible when used with high magnification eye pieces, resulting in disturbance of the image.

SUMMARY OF THE INVENTION

It is therefore an object of the present invention to avoid these disadvantages of the prior art.

It is another object of the present invention to provide a focusing screen having excellent focus discrimination without appreciable sacrifice in brightness.

It is yet a further object of the present invention to provide a focusing screen having diffusion characteristics which are selectable in advance.

It is yet a further object of the present invention to create a focusing screen by holographic techniques, either optically-generated or computer-generated, in order to obtain such characteristics.

It is still another object of the present invention to provide a method for the preparation of such a holographic focusing screen.

It is still another object pf the present invention to provide a camera having such a holographic focusing screen incorporated therein.

These and other objects in accordance with the present invention will be better understood after consideration of the present specification and accompanying drawings.

There is provided in accordance with an embodiment of the present invention a focusing screen which is itself a hologram either optically- or computer-generated, which upon reconstruction displays an image which has a dark background and a relatively light pattern thereon in which a substantial area surrounding the center of the pattern is part of said dark background.

There is also provided in accordance with an embodiment of the present invention a method for optically generating a holographic focusing screen comprising the steps of:

applying coherent light along first and second light paths:

diffusing the coherent light passing along said first light path and causing the diffused coherent light to assume a preselected pattern by placing a mask, having a relatively transmittive portion in the shape of said preselected pattern, in said path of diffused light; and arranging a holographic recording plate for exposure simultaneously to said diffused light in said preselected pattern along said first light path and said light along said second light path, thereby producing a hologram of the pattern presented by the mask.

There is also provided in accordance with an embodiment of the present invention a method of producing such a focusing screen by computer-generating a kinoform hologram for the same pattern as optically-generated by the method discussed above.

The blur (i.e. focus discrimination) obtainable with such holographic or kinoform focusing screens can exceed those obtainable for conventional ground glass focusing screens, with no sacrifice in image brightness.

BRIEF DESCRIPTION OF THE DRAWINGS

The invention will be more fully understood and appreciated in the following detailed description taken in conjunction with the drawings in which:

FIG. 4 shows a configuration of optical apparatus for producing a holographic focusing screen;

FIG. 5 shows an alternative configuration of optical apparatus for preparing a holographic focusing screen;

FIG. 6A shows another alternative configuration of optical apparatus for preparing a holographic focusing screen;

FIG. 6B shows the recording geometry of the apparatus of FIG. 6A.

FIG. 7 is an illustration of a mask suitable for use in the optical configuration in either of FIG. 4 or 5;

FIG. 8A illustrates a computer-generated kinoform having a plurality of individual cells arranged in a rectangular area;

FIG. 8B illustrates an enlargement of a single cell of the kinoform of FIG. 8A;

FIG. 9 illustrates in cross section the cell of FIG. 8B of the kinoform focusing screen of FIG. 8A;

FIG. 10 shows an optical instrument using a holographic focusing screen prepared by use of the optical configuration of FIG. 4; and FIG. 11 is a schematic illustration of a reflex photographic camera with a single lens employing a holographic focusing screen of the type produced by the configuration illustrated in FIG. 4 hereinabove.

DETAILED DESCRIPTION OF PREFERRED EMBODIMENTS

An appreciation of the desired properties of optically-generated or computer-generated holographic focusing screens as compared with conventional ground-glass focusing screens may be achieved by a consideration of the following discussion related to brightness efficiency and relative blur size.

The parameters and computations involved in focusing screen optimization are discussed in detail in "Focus-Screen Optimization" by W. T. Plummer, *Applied Optics*, vol. 14, no. 12, pages 2762 to 2765, November, 1975, the entire contents of which are hereby incorporated by reference. As is discussed in this publication, the prime purpose of a focusing screen in a camera is to make an out-of-focus image look blurry. It is well understood that when light is introduced through the lens and focusing screen of a camera and directed to the eye, the brightness of the light that actually reaches the eye divided by the brightness of the light introduced at the lens is equal to the brightness efficiency of the focusing screen. The Plummer article, while dealing specifically with ground-glass focusing screens, discloses computations from which the brightness efficiency and blur efficiency of such a focusing screen can be determined, which computations are applicable not only to ground glass screens but to any focusing screen. According to Plummer, an understanding of and a determination of the brightness efficiency and blur efficiency characteristics of a given focusing screen may be obtained from a consideration of the distribution of light which emerges in reverse from a focusing screen illuminated from the rear by a collimated pencil of light.

Figure 1:
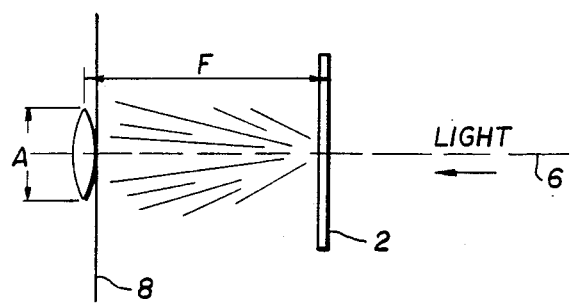
FIG. 1 is a schematic view of a lens and focusing screen reverse illuminated by a pencil of collimated light.

FIG. 1 shows a typical focusing screen 2 and lens 4 in a camera. The focusing screen 2 is illuminated by a small collimated beam 6 in the reverse direction and intercepted by a piece of paper 8 at the position of the lens 4 to display the diffused light. The distribution of light on this paper is the key to understanding and optimizing a focusing screen. The Plummer article defines a mathematical function for finding this light distribution. According to the optical reciprocity law, light trajectories through any system are independent of the direction of light. Thus, viewing the light distribution on the paper 8 is a good indication of the manner in which light focused by the lens is transmitted to the eye.

Figure 2:
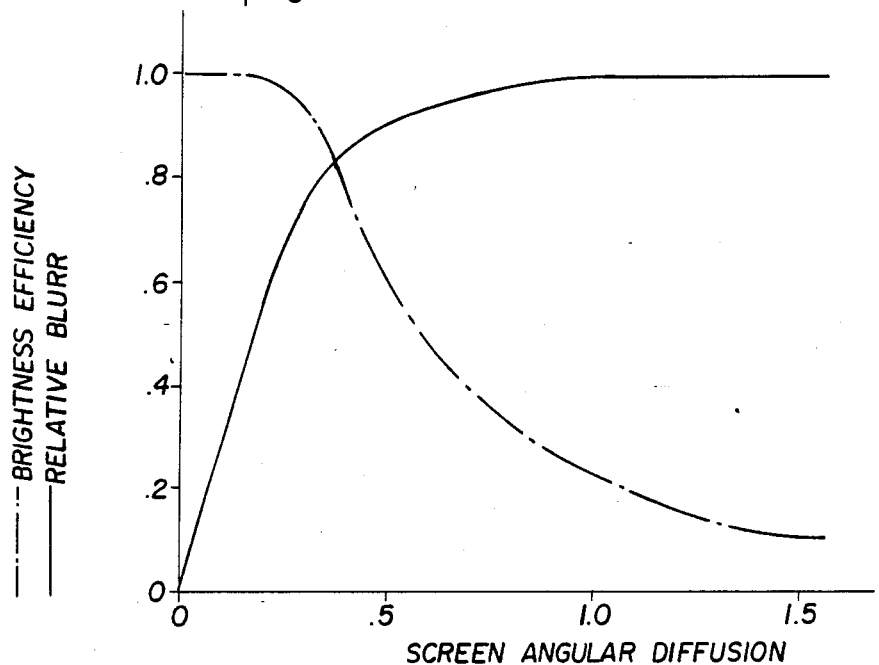
FIG. 2 is a plot showing the interrelationship between normalized RMS blur and brightness efficiency for an exemplary ground glass focusing screen.

The Plummer article shows calculations indicating that the brightness efficiency of a focusing screen may be found by comparing the reversed light flux bounded by the open aperture of the lens with that covering the entire plane of the paper 8. For ground glass this is a function of the screen angular diffusion. Thus, the only way to increase the brightness efficiency in a ground glass focusing screen is to decrease the screen angular diffusion, which in turn also causes a substantial decrease in the focus efficiency. Accordingly, in typical ground glass focusing screens, brightness can only be increased at the expense of blur characteristics and vice versa. The dependance of focus efficiency and brightness efficiency upon the screen angular diffusion for a Gaussian distribution of diffused light, which is approached by a ground glass focusing screen, is shown in FIG. 2.

It is the purpose of the present invention to design a focusing screen with brightness and blur characteristics in which an increase in the relative blur is not necessarily accompanied by a decrease in brightness. This is accomplished by using a hologram as the focusing screen. This hologram may be either optically-generated or computer-generated. It is well known that when a small beam of collimated light is directed on to a hologram, the image recorded on the hologram is displayed at the image plane. Thus, it is possible to record a hologram of any pattern which one desires to have appear as the light distribution pattern on the paper 8 in the system of FIG. 1. One can thus theoretically calculate the optimal light distribution pattern and record a hologram of an identical pattern in order to create a focusing screen with these desired optimal characteristics.

With respect to brightness characteristics, optimal brightness efficiency is obtained when all of the light distributed in the system of FIG. 1 falls within the open aperture of the lens. If a hologram is taken of a pattern with an opaque background and a transparent center, the transparent center having the same size as the lens aperture, optimal brightness will be obtained when such a hologram is used as a focusing screen because, in the system of FIG. 1, the light passing through the focusing screen will all be directed within the opening of the lens aperture.

In order to obtain optimal relative blur the Plummer article teaches that one must consider what will happen when a point object's image on the focusing screen is displaced along the axis passing through the point object, the center of the lens and the focusing screen. When the defocus increases, the point spread function on photographic film approaches a uniform disk, a projection of the camera lens aperture. The amount of blur which the eye sees when such a focus error occurs is a function of the point spread function of the out-of-focus point, which in turn is dictated by the relative weights given to light from various parts of the aperture as they are represented at the eye. Plummer also teaches that this function is displayed pictorially by light traveling through the screen in the reverse direction as shown in FIG. 1. The subjective blur of the image is represented by the root mean square (RMS) distribution of light in the point spread function.

From a consideration of the computations of Plummer, it can be seen that the greater the size of the RMS distribution of light of the point spread, the greater will be the blur. It can be shown that the aperture shape providing the greatest RMS size within an area bounded by the size of the lens aperture (for maximum brightness efficiency) is simply a ring of light having the same diameter as the lens aperture. The size of the RMS distribution of a ring of light will be much larger than the size of the RMS distribution of an entire circular area of light, which one obtains with a ground glass focusing screen or which one would obtain when the holographic image on the hologram was merely an aperture rather than a ring with a dark center.

Figure 3:
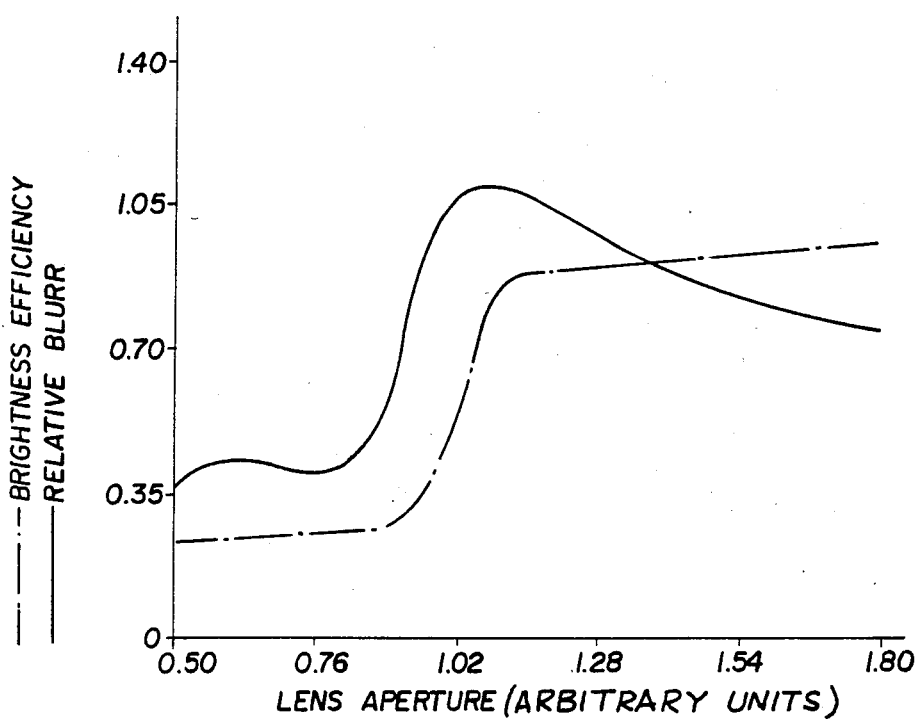
FIG. 3 is a plot showing the interrelationship between normalized RMS blur and brightness efficiency for a hologram or kinoform focusing screen.

In order to obtain a focusing screen with this type of light point distribution function, in accordance with the present invention, one may optically generate a hologram of such a pattern. As those skilled in the art of holography are well aware, a substantially identical pattern can also be computer-generated in the form of a kinoform. Using a focusing screen which is a hologram (either optically-generated or computer-generated) of the optimum pattern, one can obtain a relationship between relative blur size and brightness efficiency in white light as illustrated in FIG. 3.

The construction of an optically-generated hologram focusing screen in accordance with two embodiments of the present invention will now be explained with reference to FIGS. 4 and 5.

Referring now to FIG. 4, there is shown a laser 10 which may be any type of laser suitable for holography. Laser 10 emits a beam of coherent light 12 which is reflected by mirror 13 to a beam splitter 14. Beam splitter 14 may be a conventional light splitting cube comprising a semi-reflecting mirror. One portion of the light entering beam splitter cube 14 is deflected to impinge upon a lens-pinhole assembly 16 which causes divergence of the beam of coherent light. The thus diverging beam impinges a light sensitive holographic plate 18. The other portion of the light leaving beam splitter 14 is reflected by a mirror 15 so as to impinge upon a second lens-pinhole assembly 17 which similarly causes divergence of the coherent beam. The thus divergent second beam passes through a diffuser element 20 and then across a mask 22. The light which passes through the mask 22 impinges onto the holographic plate 18.

It will be appreciated that both portions of light impinging on holographic plate 18 are still mutually coherent. Thus, they interfere on the holographic plate creating a fine pattern of interference fringes. The center of divergence of the beams of coherent light originating from the lens-pinhole assembly 16 is arranged along the same plane, indicated by the dotted line 24, as the mask 22. The holographic plate having the interference fringes recorded thereon is subsequently processed chemically to produce a hologram.

The type of holographic plate used is not critical to the present invention and any of the conventional known holographic plates may be alternatively used in accordance with the present invention. Photographic emulsions containing silver-halide salts may be treated by a bleaching process to produce a variation in the refractive index of the emulsion by altering its chemical composition. Alternatively, a dichromated gelatin plate may be employed by producing a variation in the refractive index, or photoresist materials may be employed to produce a variation in thickness in the coating of the plate (or the plate itself). Discussions of these various types of holograms may be found in the text "Optical Holography" by R. J. Collier et al, Academic Press, New York, 1971.

The pattern recorded on the hologram will be the pattern of the relatively transmittant portion of the mask 22. The mask 22 consists of a highly transmitted portion and an opaque or relatively low transmittant background. The highly transmittant portion is hereinafter referred to as the "relatively transmittant" portion and the opaque or relatively low transmittant portion is hereinafter referred to as the "relatively opaque" or "substantially opaque" portion throughout the present specification and claims. The diffused light from the diffuser 20 passes through the relatively transmittant portion of the mask 22 before impinging on the holographic plate 18. Since, as discussed hereinabove, the optimum pattern to be recorded on such a hologram is a ring of light, the mask will preferably have a shape as shown in FIG. 7. The background of the mask 22, including the center portion 23, is preferably opaque. That pattern which is desired to be recorded on the hologram, i.e. the annulus 21, appears as a relatively light-transmittant portion of the mask, preferably transparent.

In the preferred embodiment in which the pattern to be recorded is a ring or annulus, as shown in the mask of FIG. 7, the outer diameter D of the ring 21 should approximate the diameter of the exit pupil (lens aperture) of the camera lens. Preferably, the ratio D/S (S being the distance between the mask and the holographic plate as shown in FIG. 4) is selected to be equal to the f-number (lens aperture/focal length) of the lens.

In order to obtain a truly optimum size of the mask, further considerations must be appreciated. Since the hologram is recorded with monochromatic light and is being used (i.e. the image is effectively reconstructed) in white or polychromatic light, the value of D for the reconstructed image will vary over the range of wavelengths of the white light. Thus, the value of D for the mask should be chosen as a function of the wavelength of the recording laser such that the average value of the reconstructed D will be as close as possible to the exit pupil of the camera lens. For example, if the recording light is a red laser (633 nm wave length), the reconstructed D at 555 nm (mean value of white light) will appear smaller than the D of the mask and therefore the D of the mask should be selected so as to be larger than the exit pupil of the lens by a value of 633/555 so that the mean reconstructed D will still approximate the exit pupil of the lens.

The value of the width d of the annulus 21, as shown in FIG. 7, is theoretically optimum at the smallest possible value. However, when a diffuser (such as diffuser 20 in FIG. 4) is used in recording the hologram, there is also recorded a speckled or grainy pattern which may be objectionable. The size of the speckles on the pattern is inversely proportional to the smallest meaningful detail in the object. Thus, as d decreases the speckles become larger and more objectionable. Accordingly, some compromise must be made to keep the speckles small enough and yet avoid any appreciable decrease in the efficiency of the screen. A preferred value for this purpose is S/200.

While the optimum mask pattern for general use cameras has been described hereinabove, it will be understood that the pattern may be varied substantially, perhaps in view of special applications required, and still obtain blur and brightness characteristics which are substantially better than ground glass. It is only critical that a substantial area surrounding the center of the pattern be part of the substantially opaque background; thus, the pattern may be a series of small circular or irregularly shaped apertures in a substantially circular pattern rather than an annulus.

While it is preferred that the background mask be opaque and the annulus transparent, it will be understood that as long as there is a substantial difference in the amount of light transmitted through the annulus as compared to the amount of light transmitted through the background, the mask will be operable.

Referring now to FIG. 5, there is shown a modified optical apparatus for hologram production which includes a converging lens 30. The apparatus is substantially identical to that shown in FIG. 4 and like reference numerals have been used in FIG. 5 to show portions of the apparatus which are not changed from the apparatus previously discussed with respect to FIG. 4. In the device of FIG. 5, the first, or reference, beam of coherent light which has passed through lens pinhole device 16 and is thus diverging is caused to impinge on converging lens 30 in order to form a beam which converges to a point at a distance S' behind the holographic plate 18 which is disposed along the light path. The distance S' is measured from the point of convergence behind plate 18 to the point of intersection of plate 18 with the axis between the pinhole of the device 16 and the point of convergence. The other portion of the light beam passing through the splitter 14 is directed through a lens-pinhole device 17, diffuser 20 and mask 22 all in a manner similar to that discussed with respect to FIG. 4. By causing the light passing through the mask to interfere with the converging beam of reference light, as opposed to a diverging beam as shown in FIG. 4, one obtains a holographic image of the desired pattern which has somewhat different properties than the image obtained with the diverging reference beam of FIG. 4. The hologram made in the manner shown in FIG. 5 will have the property that upon reconstruction by a diverging beam of light the aerial image will appear on the opposite side of the plate from the center of divergence of the readout beam. On the other hand, with the holograph produced in the manner shown in FIG. 4, the image will appear on the same side of the holographic plate as the center of divergence of the readout beam. This difference results in the hologram produced by the apparatus of FIG. 5 being equivilant to a combination of a hologram as produced in FIG. 4 and a lens. Thus a hologram produced in the manner shown in FIG. 5 can eliminate the necessity of a field lens at the focusing screen as has been conventional in the focusing system of cameras.

Another alternative method of producing a holographic focusing screen in accordance with the present invention is shown in FIG. 6A. With this apparatus it is not necessary to use a mask. It is well known to those skilled in the art of holography that if a holographic plate is illuminated with two collimated mutually coherent beams of light, one beam being perpendicular to the plate while the other is at an angle with respect to the first beam, a simple diffraction grating will be produced on the plate which upon reconstruction will display a point of light at infinity which is displaced from the axis of the readout beam. The apparatus of FIG. 6A accomplishes such an illumination of holographic plate 18. Until the first and second beams pass through their respective lens-pinhole assemblies 16 and 17 in the apparatus of FIG. 6A, the system is otherwise the same as those shown in FIGS. 4 and 5. Each divergent beam then passes through a collimating lens 32, 34, respectively, to provide wide parallel beams directed toward the holographic plate 18. The holographic plate 18 is arranged so as to be perpendicular to one of the two beams. In the case of FIG. 6A it is perpendicular to the first beam, passing through the lens-pinhole assembly 16 and collimating lens 32. The second beam, passing through lens-pinhole assembly 17 and collimating lens 34, is arranged such that the beam of light passing therethrough form an angle $\alpha$ with the first beam of light.

The device further includes a rotating means 36 which causes the holographic plate 18 to rotate in steps of predetermined size in its own plane. At each point of rotation of the holographic plate another exposure is taken. When the rotation and series of exposures are complete, a series of points of light around a circle will appear as the reconstructed image. The apparent diameter of the circle on which the points of light will appear is a function of the size of angle $\alpha$. The larger the angle $\alpha$ the greater the apparent diameter. Typically, this angle will be between 15° and 30°. As discussed hereinabove, the angle $\alpha$ is chosen such that the apparent diameter of the circle of points will be approximately equal to the aperture of the lens at the distance of the focal lens.

Between exposures the plate 18 is rotated in its own plane by an angle $\beta$, as shown in FIG. 6B. This process is repeated N times (where N is typically from 5 to 15). Thus, $\beta$ equals $(2\pi/N)$. The plate is then treated by a procedure identical with that used in the former examples of holographic focusing screens.

This embodiment has the advantage over the embodiments shown in FIGS. 4 and 5 in that it provides an on-axis holographic focusing screen, thus being directly interchangeable with conventional focusing screens. Because the holographic focusing screens produced by the apparatus of FIGS. 4 and 5 are off-axis, in use it is necessary to use a correcting wedge or grating. Such is not necessary with the on-axis screen produced by the apparatus of FIG. 6A. It should be appreciated, however, that the best results can only be obtained using the screen produced by the apparatus of 6A with fast (large aperture) objective lenses.

Besides optically-generated holograms, as discussed above, it is also possible for a focusing screen with the same characteristics to be computer-generated in the form of a kinoform. The production of kinoforms is described in the aforementioned reference "Optical Holography", pages 560 and 563 as well as in "The Kinoform: a New Wavefront Reconstruction Device" by Lesem et al, *IBM J. Res. Develop.* vol. 13, no. 2, pages 150–5, March 1969 and "Kinoform Lenses" by J. A. Jordon et al, *Applied Optics*, vol. 9, no. 8, pages 1883–7, August 1970. The descriptions contained in the above cited references are hereby incorporated herein by reference.

A person skilled in the art of holography and kinoforms can generate by means of a computer a kinoform which will produce an image substantially the same as that image reconstructed by the optically-generated holograms discussed hereinabove. The manner of programming a computer to generate such a kinoform is something which is within the skill of the art and forms no part, per se, of the present invention.

FIG. 8A shows in schematic form a typical kinoform screen which comprises a periodic pattern of a plurality of cells. FIG. 8B is an enlargement of a single cell 40 of the kinoform 38. In the exemplary embodiment as shown, each cell comprises a plurality of raised coaxial rings. In the example shown, the kinoform is designed for use with a lens aperture of f/3.5. In this example, the radii of the rings 42 are given as follows:

| RADIUS NO. | VALUE | POSITION |
|---|---|---|
| | | high |
| 1 | 0.8 micron | |
| | | low |

-continued

| RADIUS NO. | VALUE | POSITION |
|---|---|---|
| 2 | 1.9 micron | high |
| 3 | 3.0 micron | low |
| 4 | 4.1 micron | high |
| 5 | 5.2 micron | low |
| 6 | 6.3 micron | high |
| 7 | 7.4 micron | low |
| 8 | 8.6 micron | high |
| 9 | 9.7 micron | low |
| 10 | 10.8 micron | high |
| 11 | 11.9 micron | low |
| 12 | 13.0 micron | high |
| 13 | 14.1 micron | low |
| 14 | 15.2 micron | high |
| 15 | 16.3 micron | low |

FIG. 9 shows a cross-sectional view of a cell 40 of a kinoform screen 38 as shown in FIG. 8B taken along the line VI—VI of FIG. 8B. The thickness variation t between the raised portions 44 and the recessed portions 46 is determined by the following equation:

$$t = \frac{\lambda}{2(n-1)}$$

where n is the refractive index of the material of the kinoform (approximately 1.5 for most optical plastics) and λ is the average wavelength for the light used for reconstrucion (approximately 555 nm for white, polychromatic light).

While the above embodiment will provide a rudimentary kinoform which can be used as a focusing screen in accordance with the present invention, those skilled in the art will understand that a much more detailed kinoform can be computer-generated in order to provide a cleaner and more precise image and this a focusing screen of better brightness and blur characteristics.

The use of holograms as focusing screens in an optical instrument is illustrated in FIGS. 10 and 11. FIG. 10 illustrates the use of a holographic focusing screen in a general optical system and shows a beam of light 89 traversing an image forming optical element or system 83 such as a photographic or microscope lens. The light beam 89 passes through a field lens 84, typically a fresnel lens which is operative to collect light from the optical system 83 and direct it into an eye piece 87. A hologram 85 functioning as a focusing screen is inserted adjacent to field lens 84 for producing a controlled amount of blur for nonfocused images. The hologram 85 used in the embodiment shown in FIG. 10 is one produced by the apparatus of FIG. 4. Following the focusing screen 85 there is disposed an optical wedge 86 (or alternatively a linear grating) for directing light diffracted by focusing screen 85 towards the eye piece 87 and for directing undiffracted light away therefrom.

The optical wedge 86 is only necessary when the hologram has been produced by an off-axis such as that shown in FIGS. 4 and 5. It will be appreciated that in the case of thick on-axis holographic screens, such as those produced by the apparatus 6A or kinoforms, the wedge or linear grating 86 may be eliminated.

It will further be understood that when a hologram is made using a converging reference beam, as for example in the scheme if FIG. 5, the hologram will itself have focusing capability and accordingly the field lens 84 may not be necessary.

Referring now to FIG. 11, there is shown a typical single lens reflex camera employing a holographic focusing screen. Elements in FIG. 11 which correspond to those elements generally shown in FIG. 10 have retained the same reference numerals.

Light enters the camera through the lens 83 and is reflected by a mirror 90. Mirror 90 is of the displaceable type being mounted for rotation about an axis 91 in association with biasing spring 92 which urges mirror 90 into a generally horizontal position outside of the light path between lens 83 and the photographic film 96 disposed at the back of the camera along a vertical plane. Manipulation of the camera controls causes mirror 90 to be disposed downwardly in an inclined disposition and in releasable association with a catch member 94 which releases the mirror upon actuation of the shutter mechanism, to facilitate exposure of the film.

The light reflected by mirror 90 is collected by a field lens 84 which directs the light past holographic focusing screen 85 to a penta prism 97 which in turn directs light to an eye piece 87.

It is noted that the bottom of the prism 97 may be slightly slanted thereby producing the same effect as the use of an optical wedge 86 as described in connection with FIG. 10. Alternatively, a grating may be employed for this purpose.

When thick on-axis holograms and kinoforms are employed, both the diffused and non-diffused light propagates axially. Thus, it is possible, by proper choice of the material used in producing the holographic focusing screen, to produce a sufficiently low level of non-diffused light such that optical wedge 86 (FIG. 10), or the slanted bottom of prism 97 (FIG. 11), need not be employed. As a result, holographic focusing screens of this type may replace existing ground glass focusing screens with no other change being required to be made in the optical instrument.

It should be understood that once a single hologram is produced, particularly a kinoform, a substantially limitless number of copies thereof may be made by optical copying techniques or mechanical pressing or another suitable techniques.

It is appreciated that diffraction focusing screens of the hologram type in accordance with the present invention, whether optically-generated or computer-generated, provide a number of advantages over conventional ground glass screens which include better image brightness for viewing than offered by ground-glass screens, selectable blurring functions and the ability to produce a multiple image instead of a blur. Focusing screens of the type described hereinabove can be easily mass produced at low cost. Also, the surface structure of the focusing screens constructed and operative in accordance with the present invention can be significantly smaller than ground-glass focusing screens and thus smaller than the resolution of substantially all eye piece magnifiers in which such focusing screens are to be employed. Furthermore, since the amount of diffusion varies with wave length and the diffusion is affected by diffraction, the unsharp image will appear color fringed, thereby enhancing the viewers discrimination between sharp and unsharp images.

Many variations and changes to the exemplary embodiments illustrated herein may occur to persons skilled in the art. It is therefore stressed that the embodiments shown and described hereinabove are merely examples of possible focusing screens and techniques for producing same, and the invention is limited only by the following claims.

I claim:

1. A diffusing screen usable in bringing an image passing through an image-forming optical element or system to focus thereon, comprising an optically-generated or computer-generated holographic element which, upon reconstruction, displays an image comprising a relatively transmittant pattern on a substantially opaque background, wherein the outer periphery of said relatively transmittant pattern substantially defines a circle, said circle having a diameter approximating the diameter of the exit pupil of the optical element or system through which the image to be focused passes when in use, and wherein a substantial area of said image surrounding the center of said circle is part of said substantially opaque background, whereby a substantially annular relatively transmittant pattern is formed around the center of said circle to thereby provide a focusing screen with increased blur of out-of-focus images without substantial loss of brightness.

2. A diffusing screen in accordance with claim 1, wherein the relatively transmittant pattern of the image reconstructed by said holographic element is an annulus having an inner diameter and an outer diameter.

3. In an apparatus including an image-forming optical element or system and a focusing screen for causing out-of-focus images to appear blurry, the improvement wherein said focusing screen comprises a diffusing screen in accordance with claim 2.

4. A diffusing screen in accordance with claim 2, wherein the width of the annular portion of the annulus pattern is much smaller than the outer diameter of the annulus.

5. In an apparatus including an image-forming optical element or system and a focusing screen for causing out-of-focus images to appear blurry, the improvement wherein said focusing screen comprises a diffusing screen in accordance with claim 4.

6. In an apparatus including an image-forming optical element or system and a focusing screen for causing out-of-focus images to appear blurry, the improvement wherein said focusing screen comprises a diffusing screen in accordance with claim 1.

7. A diffusing screen in accordance with claim 1, wherein said holographic element is computer-generated.

8. In an apparatus including an image-forming optical element or system and a focusing screen for causing out-of-focus images to appear blurry, the improvement wherein said focusing screen comprises a diffusing screen in accordance with claim 7.

9. A diffusing screen in accordance with claim 1, wherein the relatively transmittant pattern of the image reconstructed by the holographic element comprises a plurality of small circular or irregularly shaped relatively transmittant areas arranged in a circle.

10. In an apparatus including an image-forming optical element or system and a focusing screen for causing out-of-focus images to appear blurry, the improvement wherein said focusing screen comprises a diffusing screen in accordance with claim 9.

11. A method for producing a holographic diffusing screen, comprising:
applying coherent light along first and second intersecting light paths;
causing the beams of light passed along said first and second light paths to become expanded;
arranging a holographic recording plate at the intersection of the two light beams such as to be perpendicular to one of said beams, said plate being rotatable about an axis that is perpendicular to the plane of said recording plate and which contains a point at substantially the center of the intersection of said two beams;
exposing said holographic recording plate to said first and second light paths for a predetermined time;
after completion of said exposure, rotating said holographic recording plate a predetermined amount about said axis;
repeating said exposing and rotating steps until a predetermined number of exposures has been completed; and
developing said plate.

12. A diffusing screen produced in accordance with the method of claim 11.

13. A method for producing a holographic diffusing screen usable in bringing an image to focus after the image has passed through an image-forming optical element or system, comprising:
applying coherent light along first and second light paths;
diffusing the coherent light passed along said first light path;
placing a mask in the path of the diffused light, said mask being substantially opaque with a relatively transmittant portion therein substantially in the form of an annulus with outer diameter D and annulus radial width d;
arranging a holographic recording plate for exposure simultaneously to said diffused light passed through said mask along said first light path and said light passed along said second light path in such a manner as to record a hologram on said holographic recording plate reproducing the pattern of said mask; and
developing said plate so as to produce a holographic diffusing screen,
wherein said outer diameter D of the relatively transmittant annular pattern of said mask is chosen so as to approximate the diameter of the exit pupil of an optical element or system through which the image to be focused passes when in use, and said annulus width d is chosen so as to leave a substantial area within said outer diameter D which is substantially opaque.

14. A diffusing screen produced in accordance with the method of claim 13.

15. A method in accordance with claim 13, wherein said second light path contains a means for causing said light passed along said second light path to diverge, said light being divergent when impinging on said holographic recording plate.

16. A diffusing screen produced in accordance with the method of claim 15.

17. In an apparatus including an image-forming optical element or system and a focusing screen for causing out-of-focus images to appear blurry, the improvement wherein said focusing screen comprises a diffusing screen in accordance with claim 16.

18. A method in accordance with claim 13, wherein said second light path contains optical means for causing said light passed along said second light path to diverge and then converge toward a point beyond the position of said holographic recording plate, said light being convergent when impinging on said holographic recording plate.

19. A diffusing screen produced in accordance with the method of claim 18.

20. In an apparatus including an image-forming optical element or system and a focusing screen for causing out-of-focus images to appear blurry, the improvement wherein said focusing screen comprises a diffusing screen in accordance with claim 19.

21. A method in accordance with claim 13, for producing a holographic diffusion screen specifically designed for use with an image forming optical element or system having a predetermined lens aperture, focal length and f-number (lens aperture/focal length), wherein the outer diameter D of the relatively transmittant annular pattern on said mask is chosen such that the ratio thereof to the distance between said mask and said holographic recording plate is substantially equal to the f-number of the optical element or system through which the image to be focused passes when in use.

22. A method in accordance with claim 13, wherein the width d of said annulus is approximately equal to 1/200th of the distance between said mask and said holographic recording plate.

* * * * *